(No Model.)  S. H. BELL.  2 Sheets—Sheet 1.
GUANO DISTRIBUTER.
No. 310,642.  Patented Jan. 13, 1885.
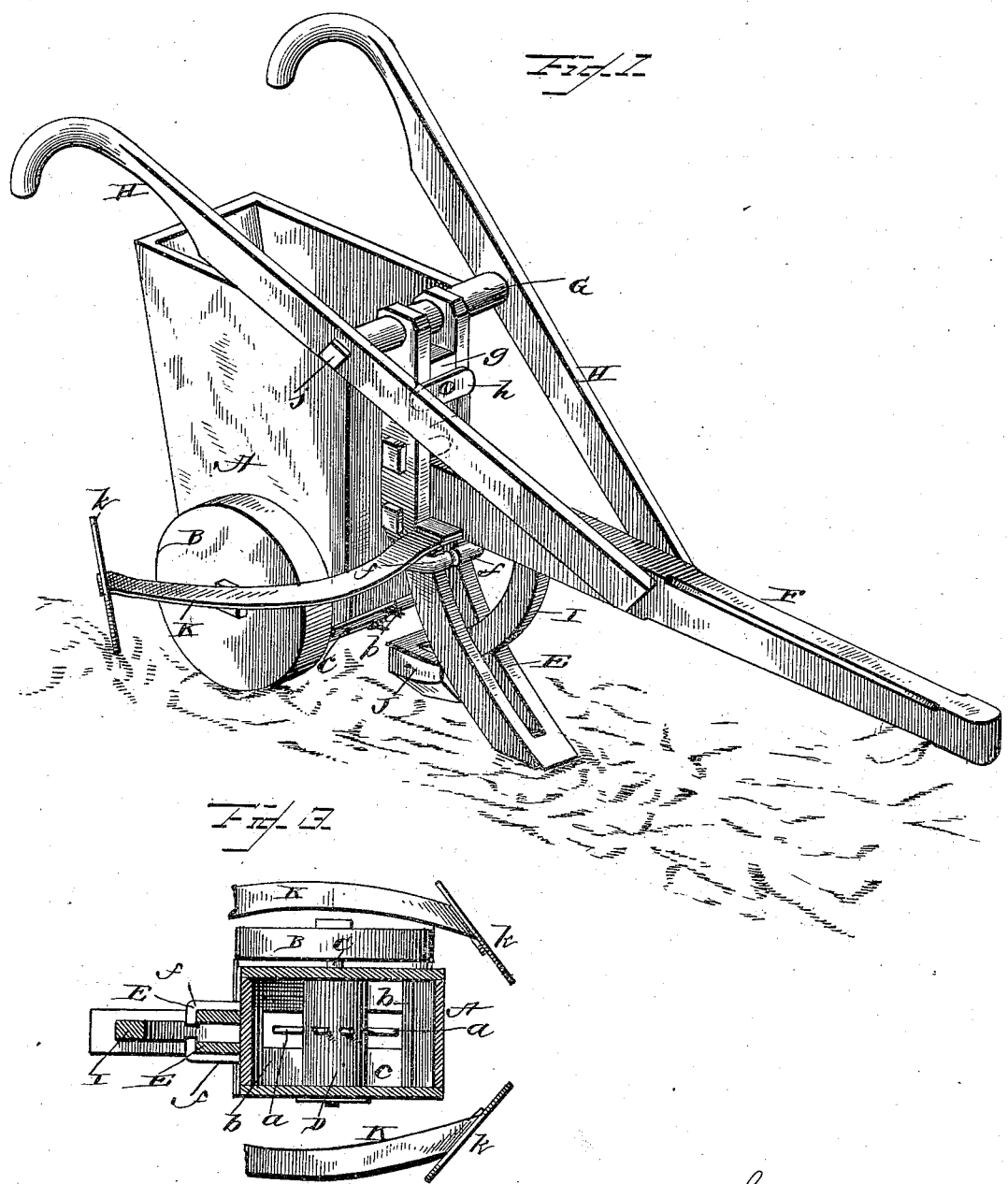
WITNESSES
Franck L. Ourand
F. B. Noyes
Samuel H. Bell,
INVENTOR
by
J. R. Littell,
Attorney.

(No Model.) 2 Sheets—Sheet 2.
S. H. BELL.
GUANO DISTRIBUTER.
No. 310,642. Patented Jan. 13, 1885.
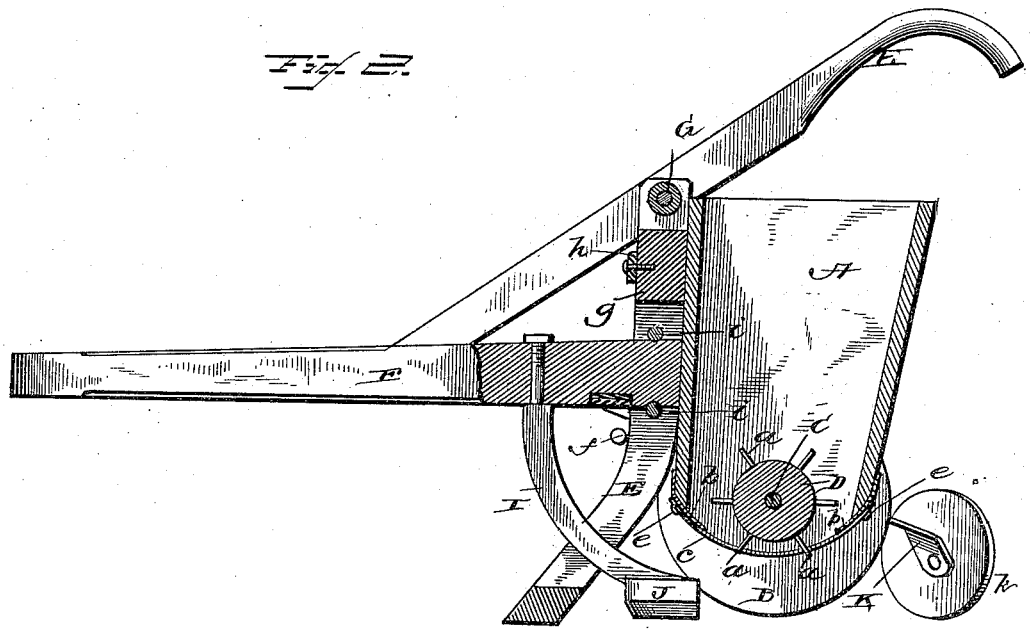
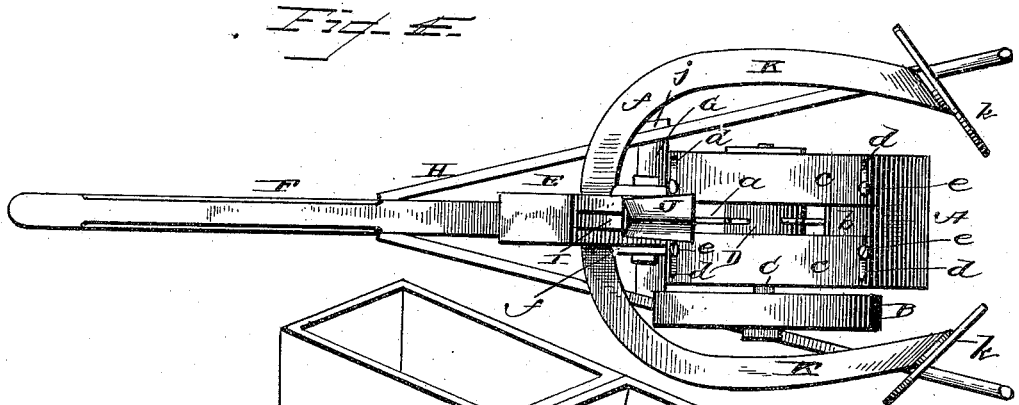
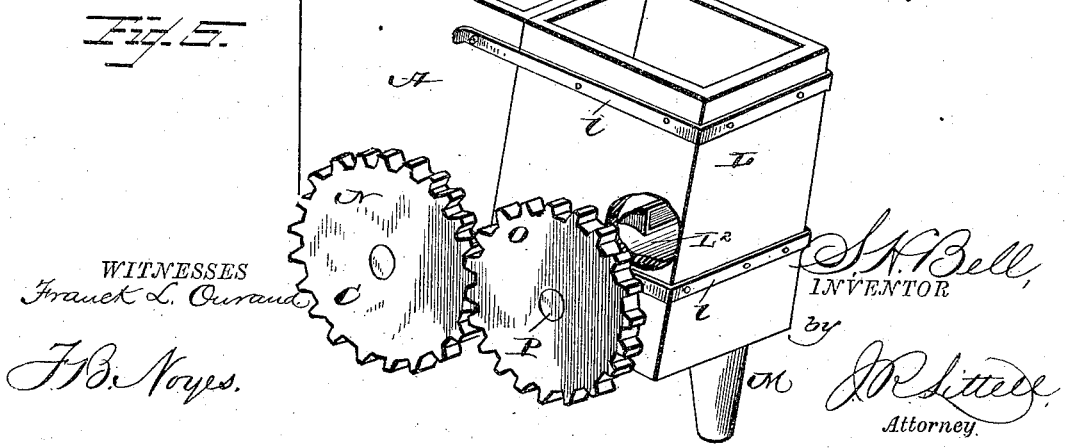
WITNESSES
Franck L. Durand
F. B. Noyes.
S. H. Bell,
INVENTOR
by
J. R. Littell,
Attorney.
N. PETERS, Photo-Lithographer, Washington, D. C.

UNITED STATES PATENT OFFICE.

SAMUEL H. BELL, OF PINCKNEYVILLE, ALABAMA.

GUANO-DISTRIBUTER.

SPECIFICATION forming part of Letters Patent No. 310,642, dated January 13, 1885.

Application filed May 13, 1884. (No model.)

*To all whom it may concern:*

Be it known that I, SAMUEL H. BELL, a citizen of the United States, residing at Pinckneyville, in the county of Clay and State of Alabama, have invented certain new and useful Improvements in Seed-Planters and Guano-Distributers; and I do hereby declare the following to be a full, clear, and exact description of the invention, such as will enable others skilled in the art to which it appertains to make and use the same.

My invention has relation to grain and seed planters and fertilizer-distributers; and it consists in the improvements hereinafter described whereby the furrows are readily opened, and the seed or grain deposited therein and effectually covered.

The improvements further contemplate an adjustment of the hopper whereby the same may yield to inequalities of the ground without interfering with the furrow-opening devices.

In the accompanying drawings, forming part of this specification, Figure 1 is a perspective view of a planter constructed in accordance with my invention. Fig. 2 is a longitudinal sectional view of the same. Fig. 3 is a horizontal sectional view. Fig. 4 is an inverted plan or bottom view. Fig. 5 is a detail side view illustrating a modification.

Corresponding parts in the figures are denoted by the same letters of reference.

The hopper A is supported by the carrying-wheel B, which is fixed on the projecting end of a shaft, C, which is transversely disposed at the base of the said hopper and turns in bearings in the sides thereof. A cylinder, D, in the hopper embraces and turns with the shaft C, the said cylinder being provided at its central portion with a radial series of projecting pins, *a*. The bottom of the hopper is composed of end sections, *b*, and parallel side plates, *c*, the said sections and plates forming conjointly a central rectangular opening. Each of the said plates *c* is provided near each end with a slot, *d*, through which one of the securing-bolts, *e*, passes to retain said plate in position. By moving the plates *c* and adjusting the bolts *e* at different points in the slots *d* the width of the bottom opening may be increased or decreased, as desired.

E E designate two vertical bars, which are contracted and connected together at their lower portions, and constitute the standard for the furrow-opening shoe or shovel, which may be attached to the lower end of standard. A loop, *f*, projecting from the lower front face of the hopper A, embraces the standard at its contracted portion, while a block, *g*, located on the front of said hopper above the loop *f*, extends between the bars E E at the upper portion of said standard. A pivoted button, *h*, in the front of the block *g* is adapted to be turned to bear on the front edges of the bars E and lock the block *g* between the same. The rear end of a draft-beam, F, rests between the bars E E, and is secured thereto by means of bolts *i*, which pass transversely through said bars immediately above and below the end of the beam. A rod, G, passes through perforations in the upper ends of the bars E E, and is threaded at its ends to pierce the central portions of the handle-bars H, clamp-nuts *j* engaging said threaded ends to effect a rigid connection of said rod G with said handle-bars. The handle-bars H converge toward their front ends, at which point they are bolted to the beam-center.

Bolted to and depending from the draft-beam F is a curved arm, I, which, passing between the bars E E beneath the loop *f*, extends rearwardly and terminates adjacent to the front end of the hopper-opening, at which point said arm supports a shoe or block, J, preferably wedge shape in its under side, and designed to smooth and adjust the furrow previous to depositing seed therein. Spring members K are secured at their front to the under side of the beam F, and extend downwardly and rearwardly to the back of the hopper A, where they carry diagonally-disposed furrow-covering disks *k*.

From the foregoing it will be readily understood that the furrow is made by the shoe at the lower portion of the standard, the furrow is adjusted by the wedge-shaped block, and the revolution of the cylinder D carries its teeth *a* to distribute the seed or grain through the bottom opening into the furrow. The disks *k* then effect the covering of the seed or grain.

By the attachment of the hopper to the standard, as hereinbefore described, the carrying-wheel B, as it passes over uneven ground, will elevate the hopper and its contained distributing-cylinder without affecting the position of the said standard and furrow-opening devices, or interfering with the operation of the same—that is to say, the loop $f$ slides vertically on the standard, while the block $g$ moves vertically between the bars E E of the same. The loop $f$ being composed of two independent hook-sections, the said hooks and the button $h$ may be readily disengaged from the bars E and the hopper removed from connection with the standard.

In the modification shown in Fig. 5 an auxiliary hopper, L, is attached to the back of the main hopper A by means of suitable spring catches or straps, $l\ l$. This hopper L is provided with a suitable cylinder, $L^2$, having a series of seeding-cups secured upon it, and adapted to drop the seed in hills, in lieu of drilling. The said hopper is provided with a guide spout or tube, M, which conveys the seed from the hopper and causes it to be dropped in the center of the furrow. Motion is transmitted to the seeding-cylinder of the hopper L by means of a gear-wheel, N, secured to the shaft C of the hopper A, and meshing with a gear-wheel, O, fixed upon the shaft P of the seeding-cylinder within the auxiliary hopper.

I claim as my invention—

1. The combination, in a seed and grain planter, of a standard carrying the furrow-opening devices, and comprising two bars, and a hopper provided with planting means, and connected to said standard by means of a loop embracing the standard, and a guide-block received between said bars, so as to play vertically with respect thereto, substantially as set forth.

2. The combination, in a seed and grain planter, of a standard comprising two bars, and carrying the furrow-opening shoe at its lower end, a wedge-shaped shoe supported at the rear end of an arm projecting upwardly between said bars, and a hopper provided with planting devices and connected to said standard so as to play vertically with respect thereto, substantially as set forth.

3. The combination, in a seed and grain planter, of a standard carrying the furrow-opening devices, a draft-beam secured to said standard, an arm secured to said draft-beam, and passing rearwardly through the standard and supporting a wedge-shaped furrow-smoothing shoe at the rear of the standard, and a hopper provided with planting devices, and connected to said standard by means of a loop embracing the standard, so as to play vertically with respect thereto, substantially as set forth.

4. The combination, in a seed and grain planter, of a standard composed of the bars contracted at their lower portions and supporting the furrow-openers, a seed-hopper provided with planting devices, a loop secured to the front of the hopper and embracing the contracted portion of said standard, a block projecting from the front of the hopper and resting between the bars, and a pivoted button on said block, substantially as and for the purpose set forth.

In testimony whereof I affix my signature in presence of two witnesses.

SAMUEL H. BELL.

Witnesses:
WILLIAM A. MELAIN,
WILLIAM J. GREEN.